(12) United States Patent
Xu et al.

(10) Patent No.: US 7,605,572 B2
(45) Date of Patent: Oct. 20, 2009

(54) INPUT CURRENT SENSING AVP METHOD FOR FUTURE VRM

(75) Inventors: Ming Xu, Blacksburg, VA (US); Fred C. Lee, Blacksburg, VA (US); Jinghai Zhou, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 264 days.

(21) Appl. No.: 11/094,433

(22) Filed: Mar. 31, 2005

(65) Prior Publication Data

US 2006/0226822 A1 Oct. 12, 2006

(51) Int. Cl.
*G05F 1/00* (2006.01)
*G05F 1/569* (2006.01)

(52) U.S. Cl. ............ 323/274; 323/276

(58) Field of Classification Search ............ 323/222, 323/282–286, 273–277
See application file for complete search history.

(56) References Cited

U.S. PATENT DOCUMENTS

| | | | | |
|---|---|---|---|---|
| 4,964,010 | A | * | 10/1990 | Miyasaka et al. ............ 361/18 |
| 5,570,276 | A | * | 10/1996 | Cuk et al. ............ 363/16 |
| 5,856,739 | A | * | 1/1999 | Trica ............ 323/222 |
| 5,982,160 | A | * | 11/1999 | Walters et al. ............ 323/282 |
| 6,058,030 | A | * | 5/2000 | Hawkes et al. ............ 363/65 |
| 6,064,187 | A | * | 5/2000 | Redl et al. ............ 323/285 |
| 6,181,120 | B1 | * | 1/2001 | Hawkes et al. ............ 323/282 |
| 6,774,612 | B1 | * | 8/2004 | Ballenger et al. ............ 323/303 |
| 6,946,822 | B2 | * | 9/2005 | Cincinelli et al. ............ 323/282 |
| 6,980,783 | B2 | * | 12/2005 | Liu et al. ............ 455/296 |
| 7,071,660 | B2 | * | 7/2006 | Xu et al. ............ 323/266 |
| 7,202,646 | B2 | * | 4/2007 | Vinciarelli ............ 323/266 |
| 2001/0002102 | A1 | * | 5/2001 | Petricek et al. ............ 323/224 |
| 2006/0203413 | A1 | * | 9/2006 | Peron et al. ............ 361/118 |

OTHER PUBLICATIONS

IEEE 2004, APEC 2004 19th Annual Applied Power Electronics Conference and Exposition (Feb. 22-26, 2004): Adaptive Voltage Posistion Design for Voltage Regulators by K. Yao, Y. Ren, J. Sun, K. Lee, M. Xu, J. Zhou, and F. C. Lee of Virginia Polytechnic Institute and State University.*

IEEE 2005, APEC 2005 20th Annual IEEE Applied Power Electronics Conference and Exposition (Mar. 6-10, 2005): A Novelty Input-Sice Current Sensing Method to Achieve AVP for Future VRs by J. Sun, J. Zhou, M. Xu, and F. C. Lee of Virginia Polytechnic Institute and State University.*

* cited by examiner

*Primary Examiner*—Jessica Han
*Assistant Examiner*—Emily Pham
(74) *Attorney, Agent, or Firm*—Whitham, Curtis, Christofferson & Cook, P.C.

(57) ABSTRACT

A voltage converter provides a desired voltage droop with load while avoiding output current sensing and active control/feedback circuits and avoiding excessive power dissipation from passive components by placing a sensing resistor in the low current, switched input circuit of the voltage converter. Therefore, the resistor conducts only when a switch controlling voltage conversion is conductive, generally at very low duty cycle and low current.

19 Claims, 7 Drawing Sheets

INPUT CURRENT SENSING AVP METHOD FOR FUTURE VRM

BACKGROUND OF THE INVENTION

1. Field of the Invention

The present invention generally relates to voltage regulator modules (VRMs) particularly for high-current, low-voltage applications such as the powering of microprocessors and, more particularly, to VRMs of adaptive voltage position (AVP) design.

2. Description of the Prior Art

The design of semiconductor integrated circuits and digital logic circuits, including memories, gate arrays and microprocessors, in particular has long exhibited a trend toward smaller circuit element size and increased density of circuit element integration on a chip in view of increased manufacturing efficiency and improved functionality and performance, particularly in terms of clock speed/cycle time and noise immunity, of the integrated circuit chips which can be realized thereby. However, small circuit element size and limitations on power dissipation requirements (particularly at higher clock speeds (e.g. above 1 GHz), as well as breakdown resistance, has led to designs operating at lower voltages while the number of circuit elements integrated on a single chip has led to requirements for higher currents to power such chips. Currently, typical power supply voltages are about 1.3 volts and can be expected to decrease in future designs. It follows that the allowable difference between maximum and minimum input supply voltages has also greatly diminished with recent designs and may be expected to decrease further. As an example, CPU supply voltage tolerance for a Pentium IV™ processor is only about 130 mV overall (e.g. a voltage variation between 1.28 volts at no load and 1.18 volts at full load .+-.20 millivolts as illustrated in FIG. 4) while corresponding current requirements currently exceed 70 A and can be expected to increase in future designs.

The large power supply current required not only poses demanding challenges in terms of power supply efficiency but also places a heavy burden on management of transient response within such a small input voltage tolerance due to the possibilities of large current steps and very fast current slew rate (e.g. typically 70 A/μsec at the current time and likely to increase in future designs). Thus, particularly for microprocessors and the like, the voltage regulator module (VRM) of a power supply must maintain a low voltage within a tight tolerance range during large current step transients with high slew rate.

To meet such transient requirements, large valued capacitors or numerous capacitors having a large aggregate capacitance in multi-stage filters have been used in the VRM output although such capacitors increase size, weight and cost. It has also been the practice to use feedback arrangements to maintain the VRM output voltage constant, or nearly so, over the entire load range. In such arrangements, the VRM output voltage was typically centered in the output voltage tolerance window and thus the transient voltage spikes must be held to less than one-half of the voltage tolerance window of the powered circuit(s). On the other hand, if overshoot and ringing can be reasonably well-controlled, the VRM output can be held just below the maximum of the voltage tolerance window at light loads and just above the minimum of the voltage tolerance window at full load, substantially the whole voltage tolerance range may be used for the voltage change during the transient and is the basic concept underlying so-called adaptive voltage positioning (AVP). Typical transient conditions of non-AVP and AVP circuits are contrasted in FIG. 1. It is clear that AVP designs allow fewer and/or smaller valued output capacitors to be used at the VRM output. Perhaps more importantly, however, AVP provides near minimum voltage at maximum load which greatly facilitates thermal design of both the VRM and the circuit(s) powered thereby.

Figure 2:
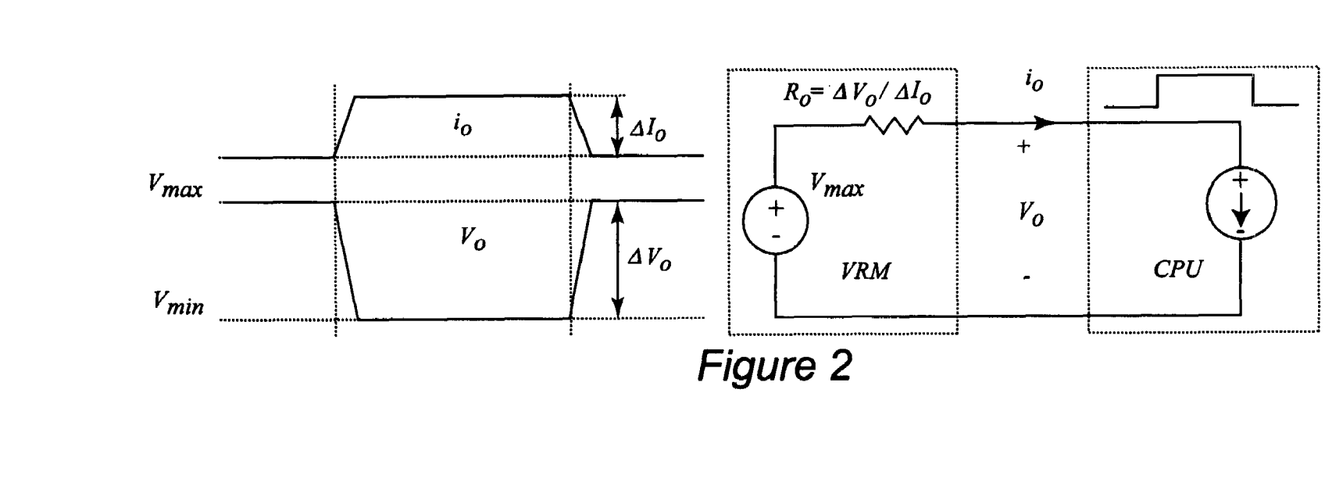
FIG. 2 is a graphical depiction of ideal AVP waveforms and an equivalent circuit of a VRM including AVP.

The basic concept of AVP is related to the steady state operation of a VRM. That is, ideally, if the transients between steady state full load and minimum load conditions have no spikes, overshoot or ringing (or other oscillations), the entire voltage tolerance window can be utilized to accommodate load transients, as shown in FIG. 2, and the AVP approach is optimal. Moreover, the comparison between the current and output voltage waveforms shown in FIG. 2 indicates that the VRM including AVP is the equivalent of an ideal voltage source and an ideal series resistance $R_o$, as illustrated in the equivalent circuit also included in FIG. 2.

Thus, in accordance with this concept, a VRM performing as an ideal voltage source with a series resistance (referred to as a "droop resistor") can achieve AVP easily. However, at low voltage and high current, the power dissipation of the droop resistor is so significant that such a simple approach is not feasible for present and future VRMs. For example, for a 100 Ampere full load current and a 1 mOhm droop resistor (corresponding to a 0.1 V voltage tolerance window), the power loss from the droop resistor alone would be 10 Watts or about 7% to 10% efficiency loss (depending on the supply output voltage near 1V) attributable to the droop resistor of the VRM, alone, while VRMs of other current designs have an overall efficiency in the range of about 86% to 92%.

In order to avoid such a large loss of efficiency while achieving some of the benefits of simplified thermal design alluded to above, an active droop concept of VRM design has been proposed and is in widespread use at the present time in commercially available VRMs. However, all such designs need to sense load current using either MOSFET $R_{dson}$ (using the synchronous rectifier MOSFET biased for conduction as a low valued resistor) or an inductor DCR sensing scheme (in which the wiring resistance of the inductor is used as a low-valued sensing resistor). Both of these sensing components have a large parameter tolerance (e.g. ±20%) and are subject to pick up of electrical noise. Consequently, it is difficult to achieve regulation within a smaller tolerance window of ±10% or less, such as the load line for the Pentium IV™ processor alluded to above. Further, the power consumed by the active feedback circuit in such arrangements also compromises and limits ultimate efficiency of the VRM, regardless of the active AVP design.

SUMMARY OF THE INVENTION

It is therefore an object of the present invention to provide a VRM including AVP without a power supply output current sensing arrangement or active control arrangement.

It is another object of the invention to provide a VRM including passive AVP with an input current sensing arrangement for reduced power dissipation from passive components In order to accomplish these and other objects of the invention, a voltage converter is provided comprising a switching device in series with an input terminal for controlling an output voltage of the voltage converter, a component for sensing average input current to the voltage converter, and a circuit for controlling the switching device to provide a desired voltage droop in the output voltage of the voltage converter with increasing load which is responsive to the output voltage of the voltage converter and the circuit for sensing input current to said voltage converter.

In accordance with another aspect of the invention, a method is provided including steps of interrupting input current from a voltage source to control an output voltage of said voltage converter, sensing average input current to said voltage converter, and controlling said interruption step to provide a desired voltage droop in said output voltage of said voltage converter, said controlling step being responsive to said output voltage of said voltage converter and said means for sensing input current to said voltage converter to passively provide desired voltage droop with increasing load.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
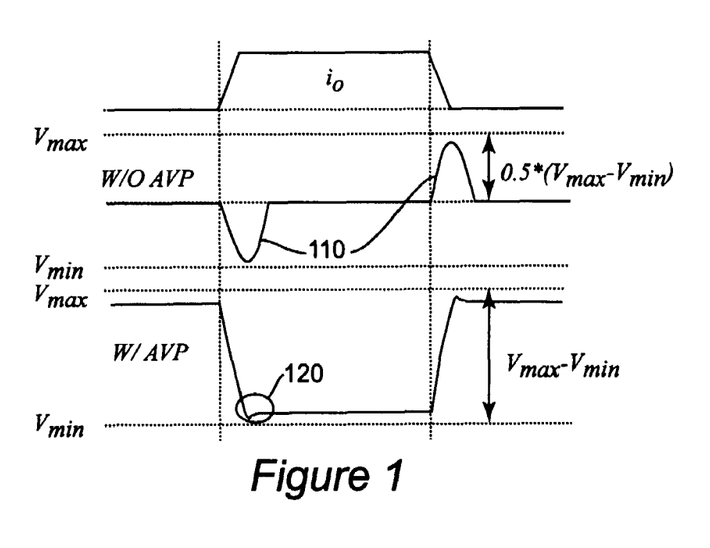
FIG. 1 is a graphical comparison of non-AVP and AVP design criteria.

Referring now to the drawings, and more particularly to FIG. 1, there is shown a graphical comparison of voltage regulator modules (VRMs) in accordance with non-adaptive voltage positioning (non-AVP) and adaptive voltage positioning (AVP), as alluded to above. Since the invention involves a new approach to the AVP design concept, the invention is considered to be represented in FIGS. 1 and 2 and no portion of either Figure is admitted to be prior art in regard to the present invention even though the AVP design concept is, itself, known.

In general, if transients, overshoot, ringing and the like are not well-controlled in a VRM circuit and the powered device has a critical input voltage tolerance window, as shown in the upper two curves of FIG. 1, the VRM output voltage should generally be positioned at or near the center of the voltage in order to best accommodate relatively large transient voltages (e.g. 110) occurring due to switching within the voltage tolerance window. On the other hand, if transients, overshoot, ringing and the like are reasonably well-controlled, the steady state low load and full load voltages can be positioned just below the maximum voltage and just above the minimum voltage of the voltage tolerance window, respectively, by an amount sufficient to accommodate any low levels of transients, overshoot and ringing which may remain in the VRM output, as shown at 120 in the lower two curves of FIG. 1. Such positioning of the low load and full load voltages of the VRM is referred to as adaptive voltage positioning (AVP) which has the further advantage of reducing power somewhat by reduction of voltage under full load conditions and thus simplifies thermal design of both the VRM and the circuit(s) powered thereby, as discussed more fully above.

FIG. 2 shows the transient response and equivalent circuit of an ideal VRM including the AVP concept. In this ideal case, there are no transients, overshoot or ringing and the low load and full load voltages can be placed at the limits (e.g. centrally of the no load and full load voltage specifications of the powered device even though some additional tolerance may be allowed, as illustrated in FIG. 4 2) of the voltage tolerance window. This design criterion also maximizes the power reduction under full load advantage of the AVP concept. Moreover, in view of voltage tolerance windows specified for microprocessors and other large scale integrated circuit devices of current and foreseeable designs, an example of which is illustrated in FIG. 4B, the AVP design concept is, in theory, ideally suited to provide varying voltage with changes in current load, and, in fact, the design of current large scale integrated circuit devices may assume that the AVP design concept is embodied in the VRM used to power the devices in view of the simplification of thermal design AVP supports, as alluded to above.

From the equivalent circuit, it can be seen that the AVP concept can be easily implemented using a single passive component (e.g. a resistor having a resistance, $R_0 = \Delta V_0 / \Delta I_0$) in series with an ideal voltage source. However, in practice, the series resistance carries the entire current delivered to the load and thus carries an efficiency penalty which is not acceptable at the present state of the art. As alluded to above, an active droop concept has been developed and utilized in commercial VRM for some time. However, the active droop concept requires the supplied current to be sensed and components suitable for the purpose such as an inductor for a DCR sensing scheme or a synchronous rectifier MOSFET having a very low $R_{dson}$ have a large parameter tolerance and cannot generally meet voltage tolerance windows which, in general, are only about half as large (as a percentage of the tolerance of the parameter of interest of the sensing component) and thus cannot regulate voltage positioning with sufficient accuracy.

Figure 3:
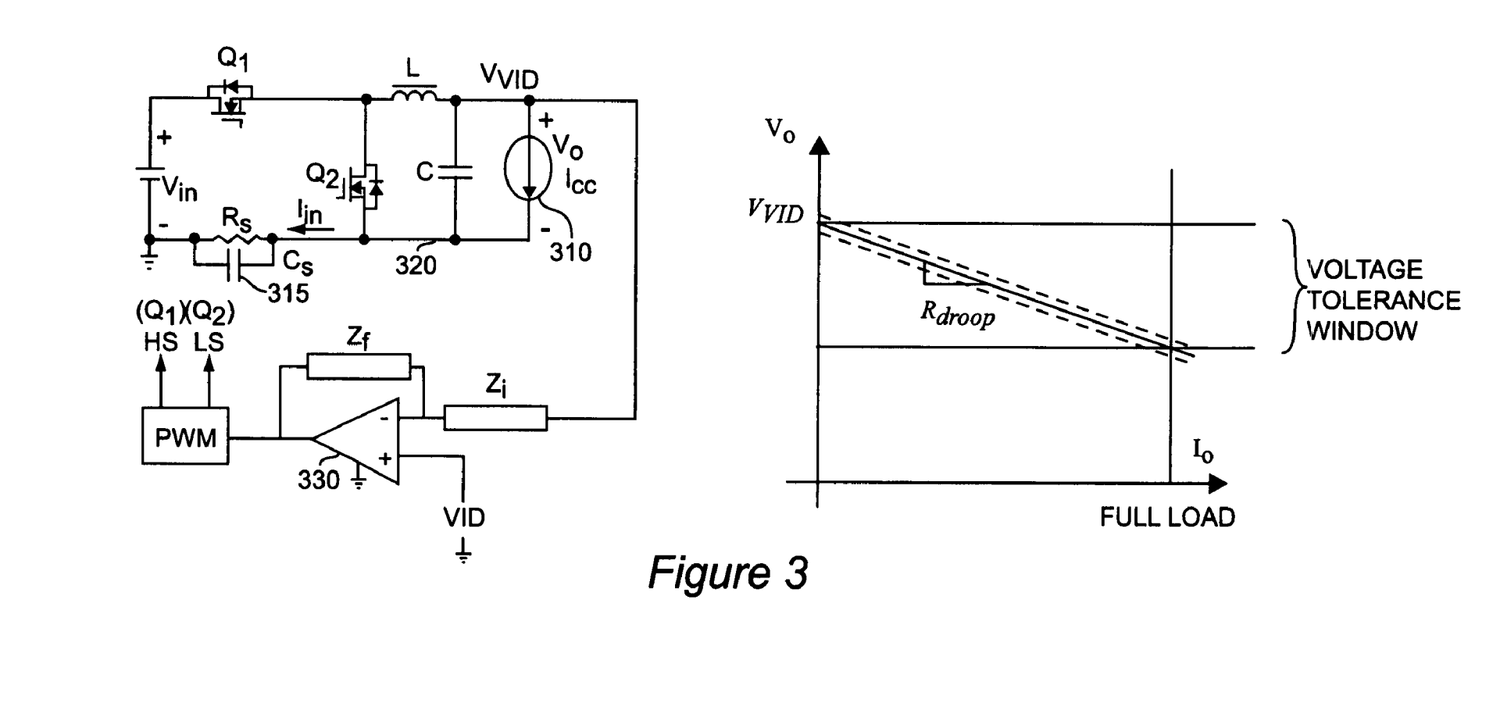
FIG. 3 is a generalized schematic diagram and current/voltage characteristic of a VRM in accordance with the invention.

Referring now to FIG. 3, a generalized schematic diagram of a VRM in accordance with the invention is shown, together with a current/voltage characteristic useful for understanding the design of voltage droop with load. Referring first to the current/voltage characteristic illustrated, the slope of the ideal current/voltage characteristic of a VRM for a particular application is basically approximated by a straight line intersecting the maximum voltage, $V_{VID}$, of an ideal voltage source at zero current at (or near) the maximum voltage of the voltage tolerance window of the device(s) to be powered and at (or near) the minimum voltage or center of the allowable voltage range (e.g. ±20 mV) of the voltage tolerance window at the maximum current (full load) of the powered device(s). The slope of the line is thus a function of $V_0/I_0$ or a resistance, referred to as $R_{droop}$ or $V_0 = V_{VID} - (I_0 * R_{droop})$.

It will be recognized by those skilled in the art that the basic VRM circuit design of the generalized schematic of FIG. 3 is basically a familiar buck converter of a single phase or branch but with a resistor $R_s$ with a filter capacitance connected in the current return path. In the interest of completeness, the buck converter of FIG. 3 comprises a voltage source $V_{in}$ with a series connected "top switch" transistor $Q_1$, a series connected inductor L of sufficient value to smooth the output voltage ripple and a storage capacitor C to supply current to the load 310 when $Q_1$ is off and to supply high transient current requirements. So-called "bottom switch" transistor $Q_2$ provides a current return path to inductor L when $Q_1$ is in an off state. The output voltage $V_{VID}$ (as referred to the control ground) is fed with a reference voltage, VID, to a comparator 330 (preferably embodied as an operational amplifier, as illustrated) for controlling a pulse width modulator PWM to develop appropriate drive signals for $Q_1$ and $Q_2$ to achieve the desired voltage. Because of the location of $R_s$ and a filter capacitor 315 in parallel therewith, preferably developing a time constant of the parallel RC or other filter circuit several (e.g. four to ten) times as long as the switching cycle period of $Q_1$, node 320 floats slightly above ground and that voltage is in series with the voltage $V_0$ applied to the load such that $V_{VID}$ is the sum of the voltage on node 320 and the voltage $V_0$ applied to the load 310. Thus, if the VRM accurately regulates voltage $V_{VID}$, $V_0$ (applied to the load) will droop with increasing voltage developed across $R_s$ with increasing average VRM input current, $I_{in}$.

That is, the operation of such a buck converter is well understood and is only varied from that mode of operation in accordance with the invention because the node 320 connecting $Q_2$ and C floats due to the series connection of $R_s$ and thus effectively increases $V_{VID}$ prior to comparison with VID (which are ideally the same voltage specified as the center of the no-load voltage tolerance of the device to be powered). Therefore, switching is controlled by PWM to cause a reduction or droop in the voltage $V_0$ across capacitor C and the load as the current load increases. However, use of a buck converter design is not necessary to the successful practice of the invention and the invention is equally applicable to other types of switching voltage converter design and may be extended to as many phases as may be desired for a given application. All that is necessary to the practice of the invention in accordance with its basic principles is to place $R_s$ in a path with reduced average current such as the switched current path having a low duty cycle such as in series with $Q_1$. Similarly, the nature of the filtering of the voltage developed across $R_s$ is not at all critical to the practice of the invention and, theoretically, even peak detection and scaling (e.g. with a voltage divider, a digital circuit or the like) of the ripple voltage developed across $R_s$ could be used. On the other hand, a simple, inexpensive, readily available and physically small capacitor is entirely adequate to the successful practice of the invention and undoubtedly allows the simplest possible circuit design to be employed.

That is, if $V_{VID}$ is taken as a reference in the generalized schematic of FIG. 3, it follows from FIG. 3 that $$I_0 = (I_{in} * V_{in} * \eta)/V_0 \quad (1)$$

where $I_{in}$ is the average input current and $\eta$ is the overall VRM efficiency at full load. When $R_s$ is selected such that $$R_s = (\eta V_{in}/V_0) * R_{droop}, \quad (2)$$

$R_s$ can be used to passively generate the voltage droop for the output but with dramatically reduced power loss due to the relatively low duty cycle of the current $I_{in}$ and the relatively larger resistance value of $R_s$ compared to $R_0$ of FIG. 2. ($R_s$ will be approximately $(V_{in}/V_0)*1/\eta$ times the value of $R_0$ or about a factor of eleven larger for $V_{in}$=12V, $V_0$=1.3V and $\eta$=0.86. and the power will be smaller by a corresponding factor in accordance with the well known formula $W=I^2R=I_{in(RMS)}^2*R_s$). In essence, $R_o$ in the ideal circuit of FIG. 2, is replaced by $R_s$ at any location where the current through it (from or to the input voltage supply) will be switched at low duty cycle (which greatly reduces the RMS current); the duty cycle generally corresponding to the difference between input and output voltages. Then, if the ripple voltage across $R_s$ is suitably filtered, a droop voltage can be directly and passively obtained while using a much larger resistance and power loss in the resistor correspondingly and dramatically reduced.

For example, assuming a 12V input and 1.3V output VRM with a 100 A output current and assuming that $R_{droop}$=1 mOhm as in the above example regarding $R_0$ in FIG. 2, the loss attributable to $R_s$ is less than 1 Watt (corresponding to less than a 1% efficiency loss or less than 10% of the loss in $R_0$) as compared with about 10 Watts in the above example of the passive droop resistor. It is also important to an appreciation of the invention to note that instantaneous load current must be sensed in order to regulate the output voltage during load transients using active droop control AVP arrangements and such sensing is highly susceptible to noise whereas, in accordance with the invention, the constant output impedance (e.g. $R_0$ of FIG. 2) is realized without sensing the current delivered from the VRM to develop a control signal for a control circuit but only passively sensing the much lower current input to the VRM with a resistor and filter; an arrangement which has very high noise immunity. Further, highly accurate, low-noise resistors are commercially available at relatively low cost and thus can be used to avoid the issue of parameter tolerance of other types of sensing components as alluded to above. Additionally, the implementation of the invention with VRMs of various designs does not require extensive modification of those basic designs and no current control loop is needed.

The above description of the basic principles and generalized embodiment of the invention as illustrated in FIG. 3 assumes an ideal voltage source and it can be seen from Equation (2) that the value of $R_s$ is based on both the input voltage, $V_{in}$, output voltage, $V_0$, and efficiency, $\eta$; all of which are subject to variation with load in real circuits. By the same token, for a given value of $R_s$, these parameters will vary as a function of each other Therefore, since $V_0$ is the parameter of interest, the effects of variation in $\eta$ and $V_{in}$ on $V_0$ will now be discussed.

Figure 4A:
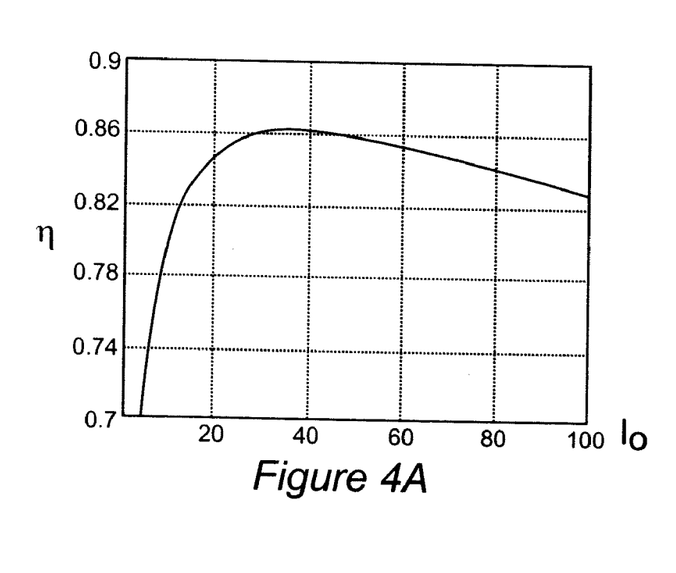
FIG. 4 depicts load line variation with efficiency change over the load change in accordance with the invention.
Figure 4B:
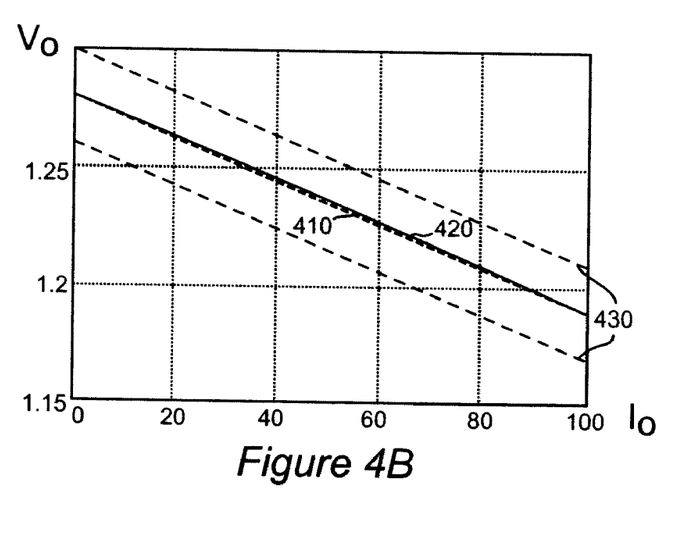

Referring now to FIGS. 4A and 4B, a generalized typical efficiency curve for conventional buck converter VRM and a generalized typical specified voltage tolerance window for a commercially available microprocessor are shown. Since these curves are generalized and do not correspond to any particular known devices and, particularly since load line variation with $\eta$ in accordance with the invention is illustrated as computed based on experimental efficiency data, no portion of FIG. 4A, 4B or 5 is admitted to be prior art in regard to the present invention.

It should be understood that, for purposes of selecting a value for $R_s$, $\eta$ is the estimated full load efficiency. However, the value of $\eta$ will vary somewhat at higher loads and will drop precipitously at low loads where the amount of power delivered to the load becomes relatively small and comparable to or even less than the power consumed by the VRM itself. Nevertheless, as illustrated in FIG. 4, for an exemplary VRM, the efficiency remains between 82% and 86% over most of the load range. Therefore, $V_0$ varies only slightly from the ideal behavior 410 with change of load over the load range as shown by curve 420 and remains well within the allowed ±20 mV tolerance indicated by dashed lines 430. In fact, the exemplary VRM in accordance with the invention exhibits a maximum variation from ideal performance of only 2 mV over the entire load range.

Figure 5:
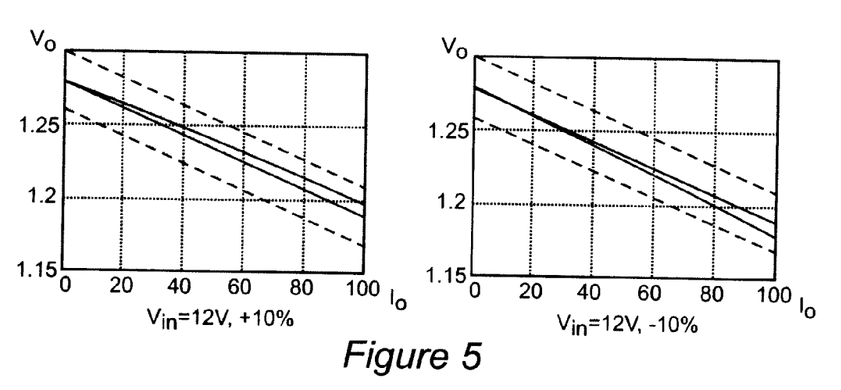
FIG. 5 depicts load line variation with input voltage change in accordance with the invention.
Figure 6:
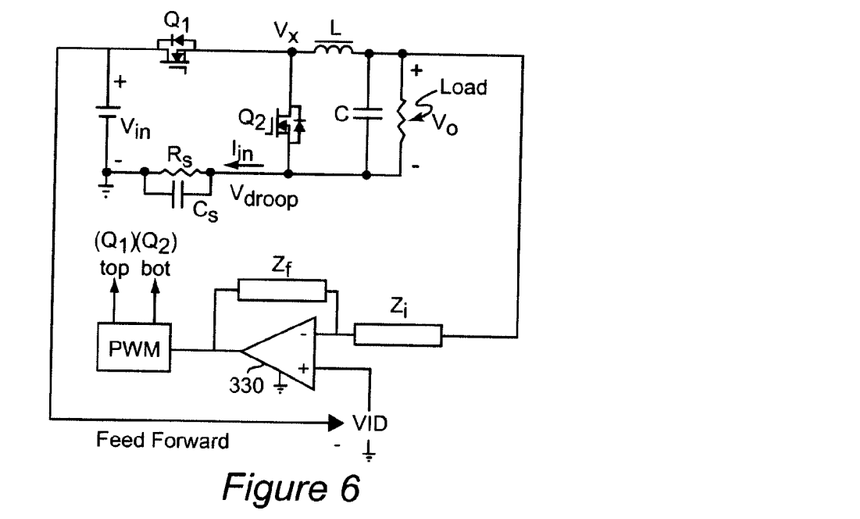
FIG. 6 is a generalized schematic diagram of the invention including a feed-forward loop to compensate for input voltage change.

Referring now to FIG. 5, variation of $V_0$ over the full load range for an increase and decrease of $V_{in}$ of 10% from a nominal input voltage of 12 V is shown. The variation from ideal performance increases with increasing load current but the maximum variation is limited to ±10 mV or roughly one-half the variation allowed for typical current microprocessor designs. This variation from ideal performance can be compensated by a simple feed forward loop to adjust the reference voltage VID at comparator 330. The circuit used to develop such an adjustment is not at all critical to the practice of the invention and many types of suitable circuits will be apparent to those skilled in the art. The circuit illustrated in FIG. 5 is otherwise identical to that of FIG. 3. Thus, it is seen that even without compensation for variation of $V_0$ for variation of $V_{in}$ the invention substantially exceeds the stringent voltage tolerance window power requirements of microprocessors of current design.

Figure 7:
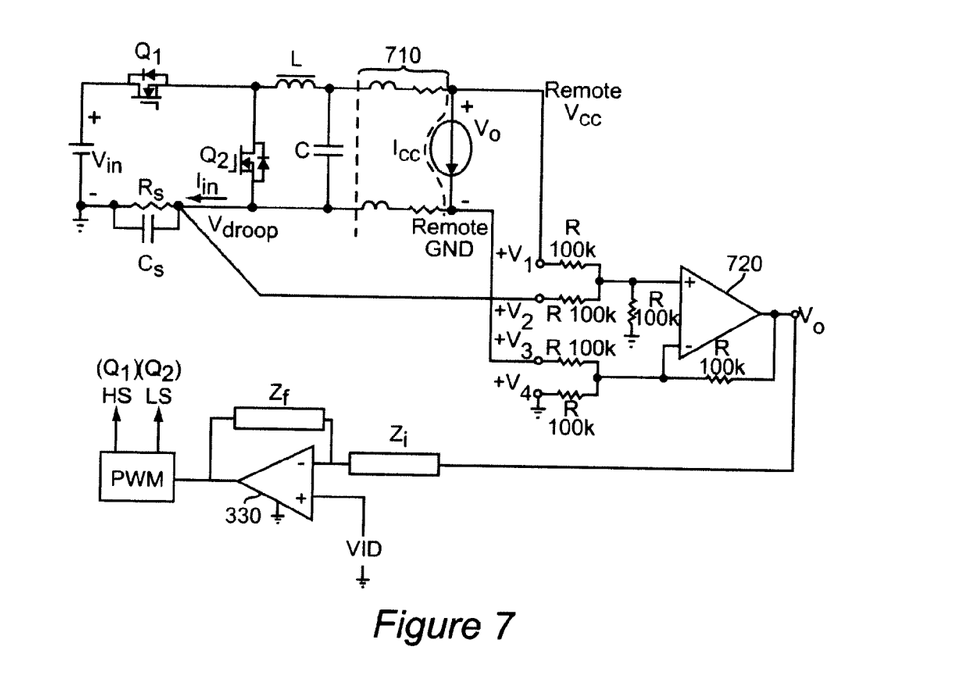
FIGS. 7, 8, 9 and 10 are schematic diagrams of different exemplary embodiments of the invention with different forms of remote voltage sensing.
Figure 8:
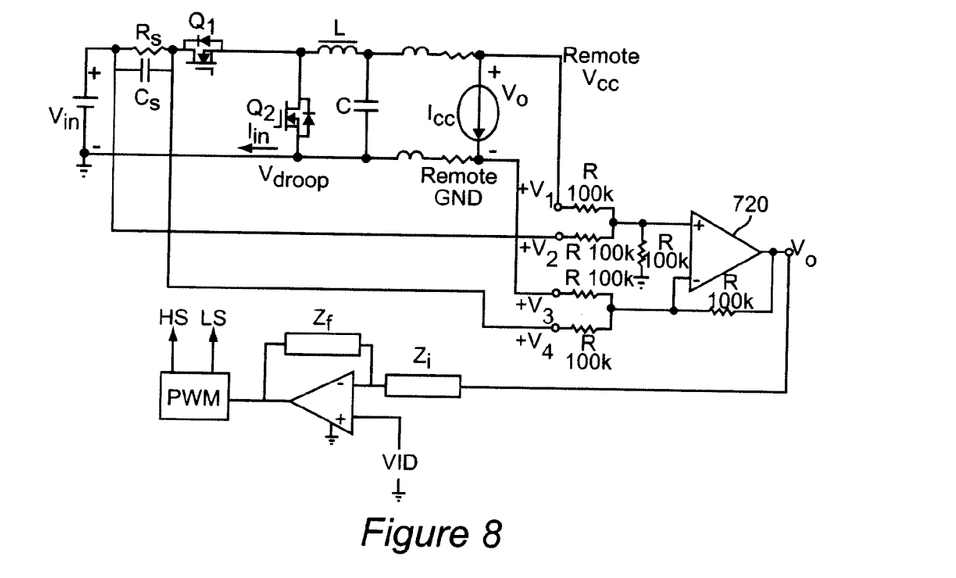

FIGS. 7-10 illustrate some variations and perfecting features of the invention. For example, in practical applications, the VRM will be located some finite distance from the powered device and while the connection will generally be quite short, some finite resistance and inductance will be presented by the connection as illustrated at 710 in FIG. 7. This resistance and inductance is also illustrated in FIG. 8. Since the current delivered to the powered device may be large, the ground voltage may tend to float at the powered device and some voltage drop may be encountered in the connection. Accordingly, to compensate for such floating and voltage drop, as a perfecting feature of the invention, an operational amplifier or other suitable circuit is provided at the location of the powered device and monitors the local value of $V_0$ ($V_{cc}$ as applied to the powered device) and is connected to a local ground as inputs through a relatively high impedance mixer connection, familiar to those skilled in the art. The reference/ground voltage and $V_{droop}$ are also monitored at the VRM through a similar high impedance connection. Input and shunt and feedback resistances are preferably the same to provide equal mixing and unity gain for all input signals but can be manipulated to adjust compensation if desired. The output of circuit 720 is provided to comparator 330 as discussed above in regard to FIGS. 3 and 5 to control the switching of $Q_1$ and $Q_2$. Other than the remote sensing circuit and connections and the schematic representation of the resistance and inductance of the power connections, the VRM circuit is identical to that of FIG. 3. The feed-forward connection discussed above in regard to FIG. 5 can also be used in the circuit of FIG. 7 (and FIGS. 8-10, as well).

FIG. 8 illustrates a variation of the VRM circuit in accordance with the invention similar to that of FIG. 7 except for the placement of $R_s$ and $C_s$ in series with the high side input voltage bus of the VRM. FIG. 8 also monitors the voltage at both sides of the droop resistor $R_s$ which are fed to both the direct and inverting inputs of operational amplifier 720 (or similar circuit). These connections effectively implement the feed forward loop discussed above in connection with FIG. 5 into the remote sensing arrangement of FIG. 7 and the remote ground and remote $V_{cc}$ are connected for monitoring and compensation in the same manner discussed above. Numerous variations on the circuits of FIGS. 7 and 8, including the use of other types of switching voltage converters will be evident to those skilled in the art.

Figure 9:
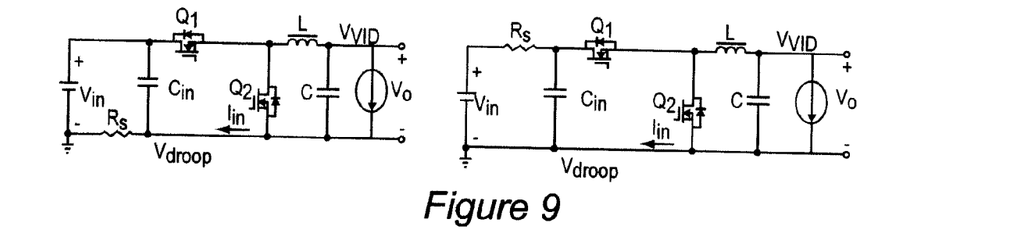

For example, some division of $R_s$ and/or $C_s$ in series with the input current path between the high side voltage bus (e.g. as in FIG. 8) and the input current return path (e.g. as in FIG. 7) could be provided to develop, for example, more complex and closely tailored compensation functions. Another possible variation is to provide an input filter capacitor $C_{in}$ between the high side voltage bus and the input current return path instead of or in addition to $C_s$ as illustrated in FIG. 9. The RC time constant criterion remains the same as discussed above regardless of the connection.

Figure 10:
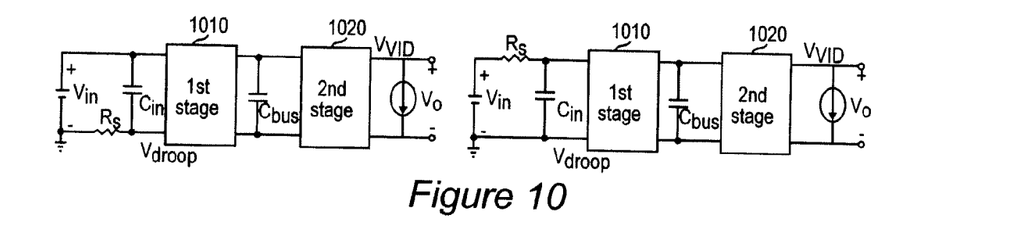

Additionally, as illustrated in FIG. 10, the VRM in accordance with the invention can be used as a first stage of a two or more stage power supply arrangement for a powered device. This type of arrangement would typically be used where power is supplied to a plurality of devices over a bus where the bus would include its own supply capacitor. This arrangement also represents the circumstance where a local or on-chip voltage regulator is provided to more closely regulate voltage for a particular chip or circuit where the supply voltage may be more critical than other chips or circuits in a given device.

Figure 11:
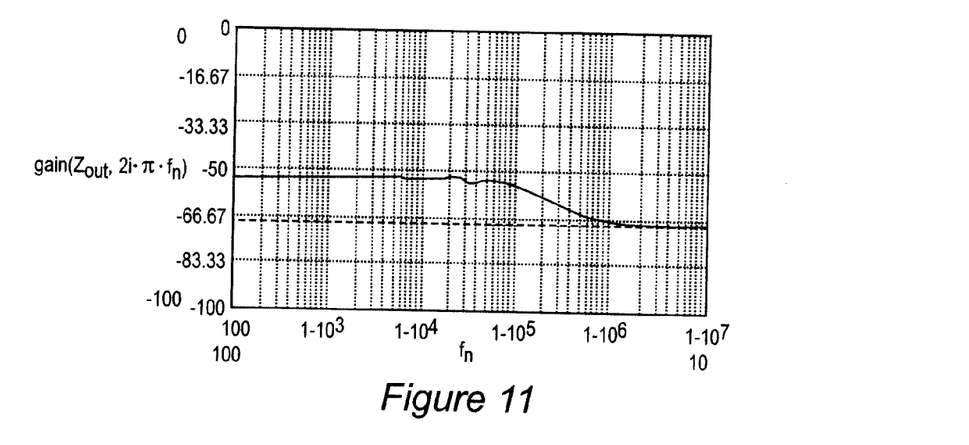
FIG. 11 is a graph of closed loop output impedance based on a small signal model in accordance with the invention.

The efficacy of the invention to provide AVP for a powered circuit where changes in load are unpredictable and may occur over a very wide range of frequencies is illustrated in FIG. 11. It will be recalled from the discussion of FIG. 2 above that voltage droop can be provided in an ideal circuit by simply providing a small resistance in series with an ideal voltage supply (which can be simulated using a feed forward arrangement, as discussed in connection with FIG. 5, or the like). The accuracy of the voltage droop thus depends on the constancy of the effective output resistance $R_0$ for a given $R_s$ which may change with frequency of load transients. FIG. 11 depicts the simulated output impedance of a VRM in accordance with the invention over a wide range of frequency of load transients and it is seen that the output resistance is very close to constant over a range of load transient frequencies up to very near 10 kHz, declines slightly over the next decade of frequencies (e.g. to about 100 kHz) and then becomes essentially constant again even where transient response of the VRM cannot directly follow the load transients and control VRM response. Moreover, the effective output resistance change between these ranges is relatively small and indicates extremely good dynamic response performance of the invention.

Figure 12:
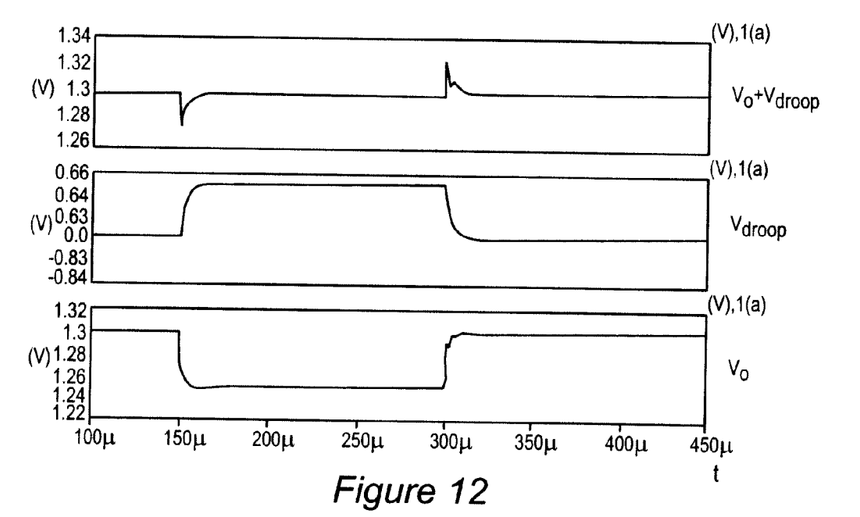
FIG. 12 is a graph of waveforms based on a simulation of the invention.
Figure 13:
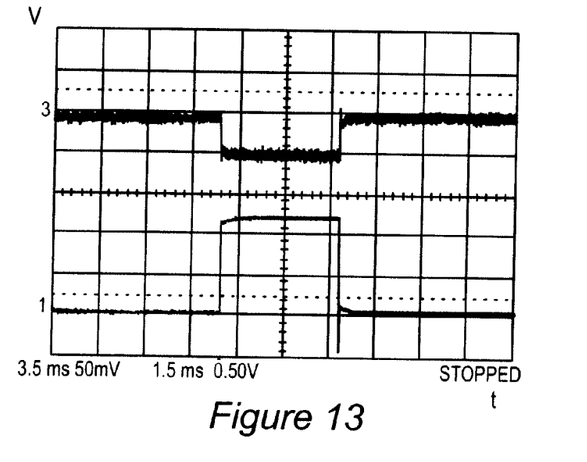
FIG. 13 is a graph of experimental transient response of the invention.

FIGS. 12 and 13 are simulation and experimental results respectively for a VRM in accordance with the invention in the form of a two channel/phase buck converter and having an input voltage of 12 V, and output voltage of 1.3 V, a maximum load current step of 38 A at a 300 A/µsec slew rate and a switching frequency of 1 MHz. It can be seen that $V_0 + V_{droop}$ is virtually constant (e.g. with only very brief transient spikes held to about ±20 mV peaks, which is principally manifested as a brief error in droop but only minimally observable, if at all, in $V_0$) with rapid and accurate transient response of both $V_o$ and $V_{droop}$ with good complementarity, indicating good AVP performance.

In view of the foregoing, it is seen that the invention provides AVP in a VRM with the addition of a minimal number of inexpensive passive components while avoiding the power consumption of a droop resistor and the power consumption and noise susceptibility of active droop arrangements. While a voltage is developed across a resistor no sensing of load current is performed but, rather, voltage droop is directly developed from that voltage on the input side of the voltage converter. Output current sensing and large parametric tolerances of current sensors are avoided and voltage droop is directly engendered by VRM switching based on the addition of $V_o$ and the droop voltage developed by a relatively large valued resistor and filter capacitor.

While the invention has been described in terms of a single preferred embodiment, those skilled in the art will recognize that the invention can be practiced with modification within the spirit and scope of the appended claims.

We claim:

1. A voltage converter comprising
    a switching device in series with an input terminal for controlling an output voltage of said voltage converter,
    means for developing a voltage due to input current from said input terminal to said voltage converter, and
    means for controlling said switching device to provide a desired voltage droop in said output voltage of said voltage converter such that said output voltage of said voltage converter is adaptively positioned above a minimum allowed voltage by an amount sufficient to accommodate transients, overshoot and ringing at maximum load and below a maximum allowed voltage by an amount sufficient to accommodate transients, overshoot and ringing at low load, said means for controlling said switching device being responsive to both said output voltage of said voltage converter and said voltage developed due to said input current.

2. The voltage converter as recited in claim 1, wherein said means for developing a voltage due to input current to said voltage converter comprises
    a resistor in series with said switching device and an output current path, said resistor being conductive when said switching device is conductive,
    a filter for smoothing a voltage developed across said resistor when said switching device is conductive, and
    wherein said means for controlling said switching device is responsive to said output voltage of said voltage converter and a voltage developed across said resistor.

3. The voltage converter as recited in claim 2, wherein said resistor is connected in a current input path to said voltage converter from a voltage source.

4. The voltage converter as recited in claim 2, wherein said resistor is connected in a current return path from said voltage converter to a voltage source.

5. The voltage converter as recited in claim 2, wherein said desired voltage droop corresponds to a resistance, $R_0$, and a resistance value of said resistor, $R_s$, is approximately $(\eta V_{in}/V_0)*R_0$ where $V_{in}$ and $V_0$ are the input and output voltages of said voltage converter and $\eta$ is the approximate full load efficiency of said voltage converter.

6. The voltage converter as recited in claim 1, wherein said means for controlling said switching device includes a pulse width modulator.

7. The voltage converter as recited in claim 2, wherein said filter includes a capacitor.

8. The voltage converter as recited in claim 7, wherein said capacitor is connected in parallel with said resistor.

9. The voltage converter as recited in claim 2, wherein said filter comprises a capacitor connected as an input capacitor for said voltage converter.

10. The voltage converter as recited in claim 2, wherein a time constant of said filter in combination with said resistor is four to ten times the switching cycle period of said switching device.

11. The voltage converter as recited in claim 1, further including a feed-forward circuit for compensating for variation in input voltage to said voltage converter.

12. The voltage converter as recited in claim 1, further including a remote voltage sensing and correction arrangement.

13. The voltage converter as recited in claim 12, further including a remote ground sensing and correction arrangement.

14. The voltage converter as recited in claim 1, further including a remote ground sensing and correction arrangement.

15. The voltage converter as recited in claim 1, further including a voltage filter or regulator or further voltage converter stage.

16. A method for passively producing voltage droop with increasing load in a voltage converter, said method comprising steps of
    interrupting input current from a voltage source to control an output voltage of said voltage converter,
    controlling a switch to supply current in said voltage converter when said input current is interrupted,
    developing a voltage due to input current to said voltage converter from an input terminal of said voltage converter, and
    controlling said interruption step to provide a desired voltage droop in said output voltage of said voltage converter such that said output voltage of said voltage converter is adaptively positioned above a minimum allowed voltage by an amount sufficient to accommodate transients, overshoot and ringing at maximum load and below a maximum allowed voltage by an amount sufficient to accommodate transients, overshoot and ringing at low load, said controlling step being responsive to both said output voltage of said voltage converter and said voltage developed due to said input current.

17. The method as recited in claim 16, including the further step of
    compensating for variation in voltage of said voltage source.

18. The method as recited in claim 16, further comprising the step of
    remotely sensing voltage or ground at a remote connection of an output of said voltage converter.

19. The method as recited on claim 16, including the further step of
    filtering, regulating or voltage converting said output voltage of said voltage converter.

* * * * *